C. B. HINSMAN.
CUMULATIVE DIAL.
APPLICATION FILED AUG. 3, 1920.
1,371,371.
Patented Mar. 15, 1921.
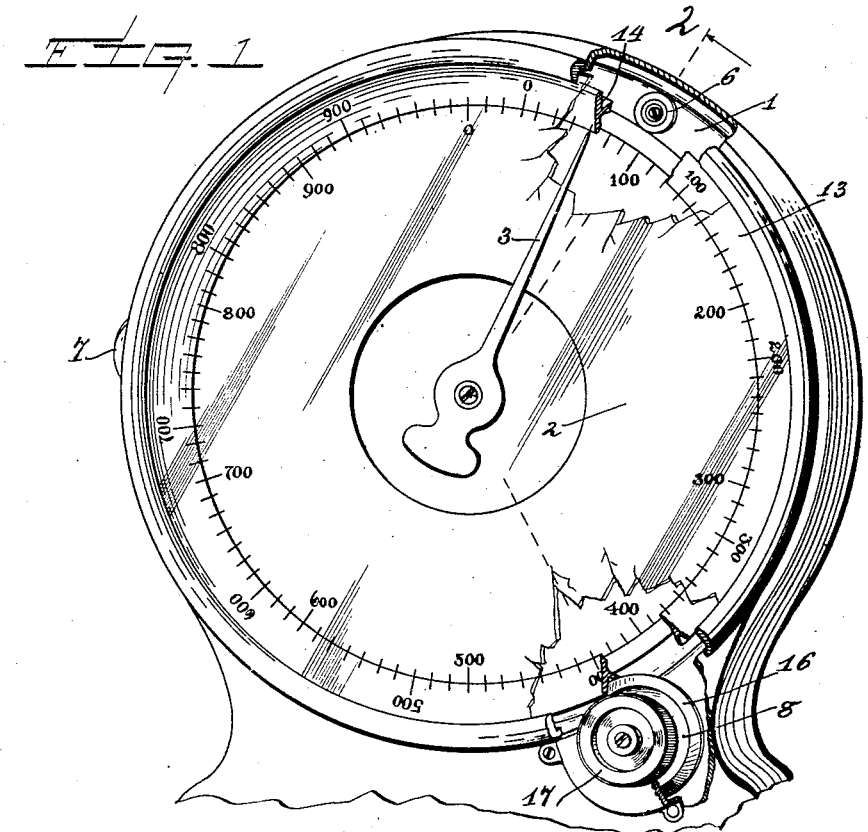
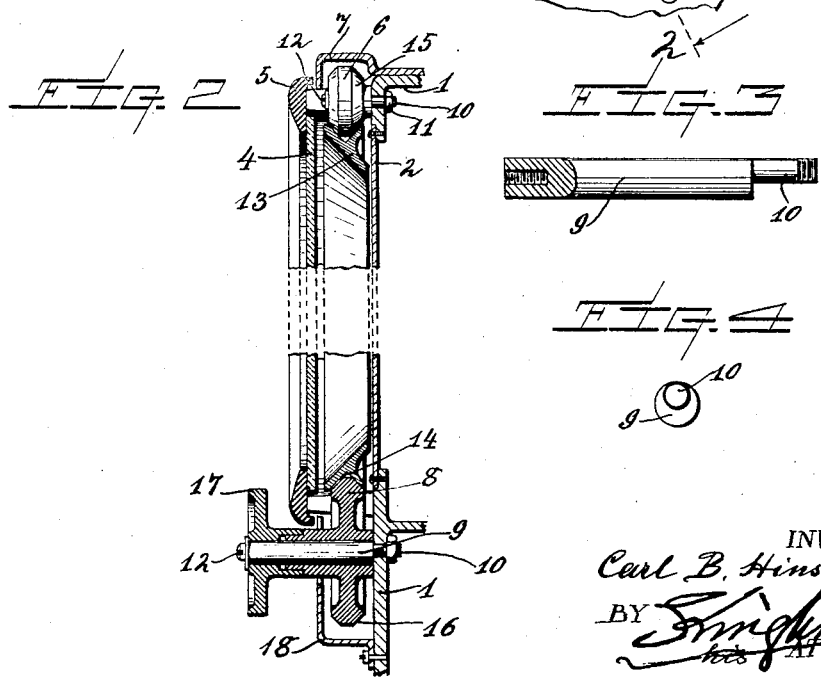
INVENTOR.
Carl B. Hinsman
BY
his ATTORNEYS.

UNITED STATES PATENT OFFICE.

CARL B. HINSMAN, OF RUTLAND, VERMONT, ASSIGNOR TO HOWE SCALE COMPANY, OF RUTLAND, VERMONT, A CORPORATION OF VERMONT.

CUMULATIVE DIAL.

1,371,371.  Specification of Letters Patent.  Patented Mar. 15, 1921.

Application filed August 3, 1920. Serial No. 400,923.

*To all whom it may concern:*

Be it known that I, CARL B. HINSMAN, a citizen of the United States, and resident of Rutland, county of Rutland, State of Vermont, have invented certain new and useful Improvements in Cumulative Dials, of which the following is a specification, the particular novel features being more fully pointed out in the annexed claims.

My invention is illustrated in the accompanying drawings in which:—

Figure 1 shows the face of the dial in perspective view, certain portions being broken away;

Fig. 2 is a transverse section on the broken line 2—2, Fig. 1;

Fig. 3 is a detail view of one of the studs which carry the friction rollers and Fig. 4 is a right hand end view of this stud.

My invention relates to cumulative dials for use in weighing scales or the like and comprises a stationary and a movable dial, having similar graduations in any suitable conventional unit such as for instance pounds, tons or the like. The movable dial is disposed in such manner that when operated, its scale or graduation will slide along the graduation of the stationary dial. The purpose of this combination is to determine the value of each increment of load as added to the scale and to show at all times also the total value of all loads on the platform at the time.

For the purpose of the present invention, it is immaterial in which manner and by what mechanism the indicator is moved over the dial and, therefore, the mechanism for operating the indicator by the load has been omitted, and only the indicator itself is shown together with the elements which relate more closely to the present invention.

Referring to Figs. 1 and 2 of the drawings, 1 is the frame of the housing in which the weighing mechanism is disposed. 2 is the stationary dial such as is used in the conventional form of scales and 3 is the hand or indicator operated by the weighing mechanism and revolving over the graduation of the stationary dial 2. 4 is the glass plate disposed in front of dial 2 and held in place in any suitable manner for instance by the rim 5 attached to a portion of frame or casing 1. A number of rollers, preferably three, are provided on the periphery of frame 1 outside of the periphery of dial 2. Two of the rollers are of the same size and the third one is of considerably larger size. Of the two smaller rollers, only the one denoted with 6 is shown, the other of these rollers being placed on the periphery 120° apart, its location being denoted by the housing 7. The larger of the three rollers is denoted with 8 and disposed preferably at the lower portion of the housing.

Each of these rollers is mounted on a stud 9 which is shown in detail in Figs. 3 and 4. From these figures, it will be seen that the seating pin 10 which seats in frame 1 is located eccentrically to the axis of stud 9. Seating pin 10 is held in frame 1 by means of a nut 11. In each case the roller revolves on stud 9 and is held in place by a screw 12 threaded into the outer end of the stud. By this construction, it will be seen that it becomes possible to move the rollers slightly toward or away from the dial center in a radial direction within the limits of the eccentricity of the studs by slightly turning studs 9 after the holding nuts 11 have been slightly loosened. The purpose of this construction will be described presently.

The movable dial 13 is arranged concentrically with stationary dial 2 and has preferably the shape of a ring, as shown in Figs. 1 and 2, beveled on its face toward dial 2, the graduation being arranged on this inner beveled periphery. The outer periphery of ring 13 has the form of a V-shaped groove 14, as shown in Figs. 1 and 2, and the two rollers 6 and roller 8 are correspondingly beveled on an inverted V as shown at 15 and 16 in Figs. 1 and 2, the inverted V having the same angle as the V-groove in ring 13. By these rollers 6—6 and 8, ring 13 is thus guided and held in place so that it may revolve concentrically to the fixed dial 2. The purpose of the eccentric seating of studs 9 is to properly center ring 2 relatively to the center of fixed dial 2 by slightly turning the studs in one or the other direction as described above and also to keep the rollers in sufficiently close contact with ring 13 so as to enable the latter to be frictionally driven from the large roller 8. This latter roller, as will be seen from Figs. 1 and 2, is provided with a knurled knob 17 suitably attached to the roller so that the latter can be hand-operated thereby. The rollers are protected by sheet metal casings 7 and 18 shown in Fig. 2. By operating knob 17 thus, the scale of movable dial 13 can be revolved around the scale of fixed dial 2.

The manner of using this combination as a "cumulative" or "loading" mechanism is as follows:—Both dials are graduated alike and in the same direction, for instance to the right. With nothing on the scale platform, the indicator stands at the zero point of the fixed dial, and the zero point of the movable dial registers with the fixed zero point. If a load is placed on the scale platform, say 100 lbs., the pointer 3 would indicate this weight on both graduations alike. Then, the operator moves the cumulative dial 13 so that its zero point registers with the pointer standing at the 100 lb. mark of the stationary dial. Assuming now that another load of 50 lbs. is added to the platform, the pointer 3 will indicate on the stationary dial a total load of 150 lbs., but the cumulative dial 13 will indicate that the weight of the increment added was 50 lbs. Next, the operator moves the cumulative dial so that its zero point registers with the 150 lb. mark on the stationary dial where the indicator stands and now another load increment may be added and its individual weight may be ascertained on the cumulative dial in the same manner as described before, the total weight of the three increments being shown on the stationary dial. This process may be repeated until the capacity of the stationary dial is exhausted.

Of course any other suitable manner of graduation may be used with this mechanism for other purposes such for instance as ascertaining the weight of load increments removed from the total weight. The movable dial thus may for instance be graduated from zero to the left, while the stationary dial is graduated from zero to the right as shown. It appears to be unnecessary as an obvious matter to particularly illustrate the different directions of graduation or combinations of graduations because these may be employed without departing from the spirit or without widening the scope of my invention, the principal usefulness of which is to enable the operator to read the total value and the individual values directly without figuring the result.

I claim:—

1. A cumulative dial for scales or the like, comprising a fixed dial graduated in suitable weight units, a movable dial, similarly graduated and disposed independent of said fixed dial and adapted to rotate concentrically to the fixed dial and along the graduation thereof, means for rotating said movable dial, means for centering said movable dial relatively to the center of the fixed dial and an indicator adapted to pass simultaneously over both graduations.

2. A cumulative dial for scales or the like, comprising a fixed dial graduated in suitable weight units, an indicator rotating over said graduation, a movable dial rotatably disposed adjacent to but independent of the fixed dial and consisting of a ring having a beveled face provided with similar graduations, and located adjacent to those of the fixed dial, a plurality of rollers adapted to guide said ring concentrically to said fixed dial, means for operating one of said rollers to frictionally drive said ring, and means for moving said rollers radially to said fixed dial to center said ring relatively to the fixed dial.

3. A cumulative dial for scales or the like, comprising a fixed dial graduated in suitable weight units, an indicator rotating over said graduation, a movable dial rotatably disposed adjacent to but independent of the fixed dial and consisting of a ring having a beveled face provided with similar graduations, and located adjacent to those of the fixed dial, said ring having a V-shaped groove in its periphery, a plurality of rollers each having an inverted V-shaped periphery and being distributed along the periphery of said ring to engage in its V-groove to guide the ring concentrically to said fixed dial, a stud for each roller, having a seating pin located eccentrically to the stud axis to permit the adjustment of the stud toward and away from the center of the fixed dial by slightly rotating the stud, to effect the centering of said ring relatively to said dial center, one of said rollers having a hand-operated knob attached to it for frictionally rotating said ring.

CARL B. HINSMAN.